United States Patent [19]

Hitchings

[11] Patent Number: 5,676,731
[45] Date of Patent: Oct. 14, 1997

[54] METHOD FOR FILTERING MOLTEN METAL

[76] Inventor: Jay Hitchings, 1393 Piedmont Dr., Downingtown, Pa. 19335

[21] Appl. No.: 705,838

[22] Filed: Aug. 30, 1996

Related U.S. Application Data

[62] Division of Ser. No. 290,181, Aug. 15, 1994, Pat. No. 5,556,592.

[51] Int. Cl.$^6$ .................................................. C21C 7/00
[52] U.S. Cl. ................... 75/407; 75/412; 266/227; 164/134; 164/358; 210/387; 210/405; 210/507; 210/780
[58] Field of Search ...................... 210/143, 387, 210/400, 405, 445, 446, 503, 504, 505, 507, 767, 780, 783; 164/134, 358; 75/407, 408, 409, 410, 411, 412; 266/227

[56] References Cited

U.S. PATENT DOCUMENTS

| | | |
|---|---|---|
| 2,757,425 | 8/1956 | Duncan et al. |
| 3,663,182 | 5/1972 | Hamling ..................... 23/355 |
| 3,899,426 | 8/1975 | Hirs ............................ 210/387 |
| 3,912,632 | 10/1975 | Winzen ...................... 210/137 |
| 3,940,335 | 2/1976 | Kalman ...................... 210/77 |
| 3,981,352 | 9/1976 | Nuriminen et al. ........ 164/358 |
| 4,159,104 | 6/1979 | Dantzig et al. ............. 266/215 |
| 4,477,350 | 10/1984 | Brandt et al. .............. 210/387 |
| 4,481,108 | 11/1984 | Bratten ...................... 210/137 |
| 4,511,320 | 4/1985 | Lambertus ................. 425/199 |
| 4,686,043 | 8/1987 | Yagishita et al. .......... 210/387 |
| 4,769,158 | 9/1988 | Eckert ........................ 210/780 |
| 4,955,427 | 9/1990 | Hitchings .................. 164/358 |
| 4,990,059 | 2/1991 | James ........................ 417/50 |
| 5,104,540 | 4/1992 | Day et al. .................. 210/510.1 |
| 5,124,040 | 6/1992 | Hitchings .................. 210/639 |
| 5,202,081 | 4/1993 | Lake et al. ................. 266/231 |
| 5,238,571 | 8/1993 | Menk ......................... 210/510.1 |
| 5,556,592 | 9/1996 | Hitchings .................. 266/227 |

FOREIGN PATENT DOCUMENTS 0980938 12/1982 U.S.S.R. ................... 164/134

OTHER PUBLICATIONS

"Refractory Cloth Filtration of Ductile Iron and the Mechanism of Inclusion Trapping," J. R. Hitchings, Amenex Associates, Inc., S. Clark, R.H. Sheppard Company.

"Development of Refractory Woven Cloth Inserts To Enable Gating Break Up And Riser Removal During Shakeout of Ductile Iron Castings," Robert Hartzler, Foundry Metallurgist Belleville Foundry, Carl R. Loper, Jr., Professor, Department of Materials Science and Engineering, The University of Wisconsin-Madison, Oct. 1992.

"Incast" International Magazine of the Investment Casting Institute, May, 1993, vol. VI, No. 4.

"New molten metal filters," Reprinted from the Aug. 1991 issue of Modern Casting, a publication of the American Foundrymen's Society, Inc.

*Primary Examiner*—Robert Popovics
*Attorney, Agent, or Firm*—Alan G. Towner; Eckert Seamans Cherin & Mellott, LLC

[57] ABSTRACT

An apparatus and method for filtering molten metal are disclosed. The apparatus utilizes a continuous filtering medium that is serially indexed into the metal filtering area. The apparatus may be used to filter ferrous and non-ferrous metals, and provides significant cost and time savings. In one embodiment the apparatus allows automatic indexing of a new filter for each shot or pour on high production casting machines. In another embodiment the apparatus is adapted to filter large amounts of metal up to 5,000 pounds or more.

14 Claims, 4 Drawing Sheets

METHOD FOR FILTERING MOLTEN METAL

CROSS REFERENCE TO RELATED APPLICATION

This application is a division of application Ser. No. 08/290,181, filed Aug. 15, 1994, now U.S. Pat. No. 5,556,592.

FIELD OF THE INVENTION

The present invention relates to the filtration of molten metal. More particularly, the invention relates to an apparatus and method for filtering ferrous and non-ferrous molten metals using a continuous filtering medium that is serially introduced into a molten metal stream.

BACKGROUND OF THE INVENTION

Filtration of molten cast metals has been demonstrated to be an effective method of improving overall casting quality. Filtration enhances the mechanical and physical properties of castings by removing inclusions from the molten metal before they can enter the mold cavity.

There are numerous applications in foundry practice where quantities of molten metal are poured repetitiously into holding furnaces for replenishment of metal used, into die casters for each shot and in pigging operations. Those foundry operations that require repetitive or automatic pouring of molten metals, especially aluminum, into casting machines such as die-casters and permanent mold casting operations cannot easily utilize filters in their gating systems. Therefore the metal is usually filtered in a holding furnace dip-well prior to being poured into the machine. These operations typically utilize a robot to dip into the furnace dip-well and then pour the metal into the casting machine. Aluminum is usually the metal cast in these operations, and even though it is filtered in the holding furnace it will form dross or oxides immediately upon exposure to the air as it is dipped out of the dip-well. Being able to filter the metal as it is being poured into a casting machine would be a great advantage. Most of these operations are also high production. For example, die-casting machines typically make 30 to 60 shots per hour. These operations would benefit greatly by having a new filter automatically positioned for filtration of each shot or pour.

There are also many operations, especially in foundries, where batch quantities of molten metal are treated with master alloys, ferroalloys and inoculants that create reaction products such as oxides, sulfides and slags. These impurities cause many problems in holding furnaces such as slag build-up on furnace walls and pouring nozzle clogging, which result in costly down time and excessive maintenance.

In highly automated ductile iron foundries high production molding machines are used that make a mold every 10 to 15 seconds. The holding furnaces that feed metal to these molding lines are typically replenished with 1200 to 3000 pounds of ductile iron every 10 to 30 minutes. Batch treated ductile iron is also transferred from the treatment ladle into smaller pouring ladles. Filtering the metal at this stage would result in much less maintenance of the pouring ladles plus provide cleaner metal to the mold line.

Ceramic filters are extensively used in the foundry industry to improve casting cleanliness and to reduce the number of castings that must be scrapped due to the presence of unwanted impurities. Such ceramic filters are typically incorporated into the gating system in order to remove slag, dross, and other particles from the metal stream before the metal enters the mold cavity. The most common types of ceramic filters comprise hard-fired cellular ceramic structures and rigid reticulated ceramic foam. These filters are relatively thick and, due to their massive structure, tend to chill the first molten metal that reaches the filter, requiring relatively coarse openings to ensure reliable passage of the molten metal. Cellular extruded ceramic filters therefore rely on the formation of a filter cake on the upstream side to remove smaller inclusions that would otherwise pass through the openings in the filter. Ceramic foam filters, while providing a more tortuous path for the molten metal than cellular filters, also exhibit the formation of a filter cake which can become the controlling factor for the size of the inclusions that the filter will remove.

Recently, refractory cloths made from materials such as fiberglass and silica have been used as metal filtration media. The most common refractory cloth for filtering high temperature ferrous metals comprises woven silica fibers. U.S. Pat. No. 5,124,040 to Hitchings, which is hereby incorporated by reference, discloses a silica cloth filter having a carbonaceous coating that produces improved filtering characteristics.

Conventional molten metal filters are typically only able to be used once because of the impurities that they collect and because the molten metal solidifies around them after the pouring operation, particularly when they are used in mold gating systems. Prior art hard-fired ceramic filters and ceramic cloth filters are usually placed by hand before each pouring operation, adding significantly to processing costs. Conventional molten metal filtering apparatuses incorporating ceramic filters are disclosed in U.S. Pat. No. 5,202,081 to Lake et al., 4,990,059 to James, and U.S. Pat. No. 4,159,104 to Dantzig et al.

At the present time there is no commercially available filtration equipment to automatically filter significant quantities of metal with automatic replacement of the filter media, particularly as the metal flows into a holding furnace or pouring ladle. The present invention has been developed in view of the foregoing and to overcome other deficiencies of the prior art.

SUMMARY OF THE INVENTION

An object of the present invention is to provide a novel apparatus for filtering molten metal.

Another object of the present invention is to provide an apparatus for filtering molten metal comprising an inlet for supplying molten metal, an outlet in communication with the inlet for receiving molten metal, a molten metal filter disposed between the inlet and outlet, and means for serially indexing portions of the molten metal filter into an area between the inlet and outlet to filter the molten metal.

A further object of the present invention is to provide a novel method for filtering molten metal.

Another object of the present invention is to provide a method for filtering molten metal comprising providing a flow of molten metal, contacting the molten metal with a portion of a molten metal filter, stopping the flow of molten metal, indexing another portion of the molten metal filter into the area of molten metal flow, continuing the flow of molten metal, and contacting the molten metal with the new portion of the molten metal filter.

DETAILED DESCRIPTION OF THE PREFERRED EMBODIMENTS

Figure 1:
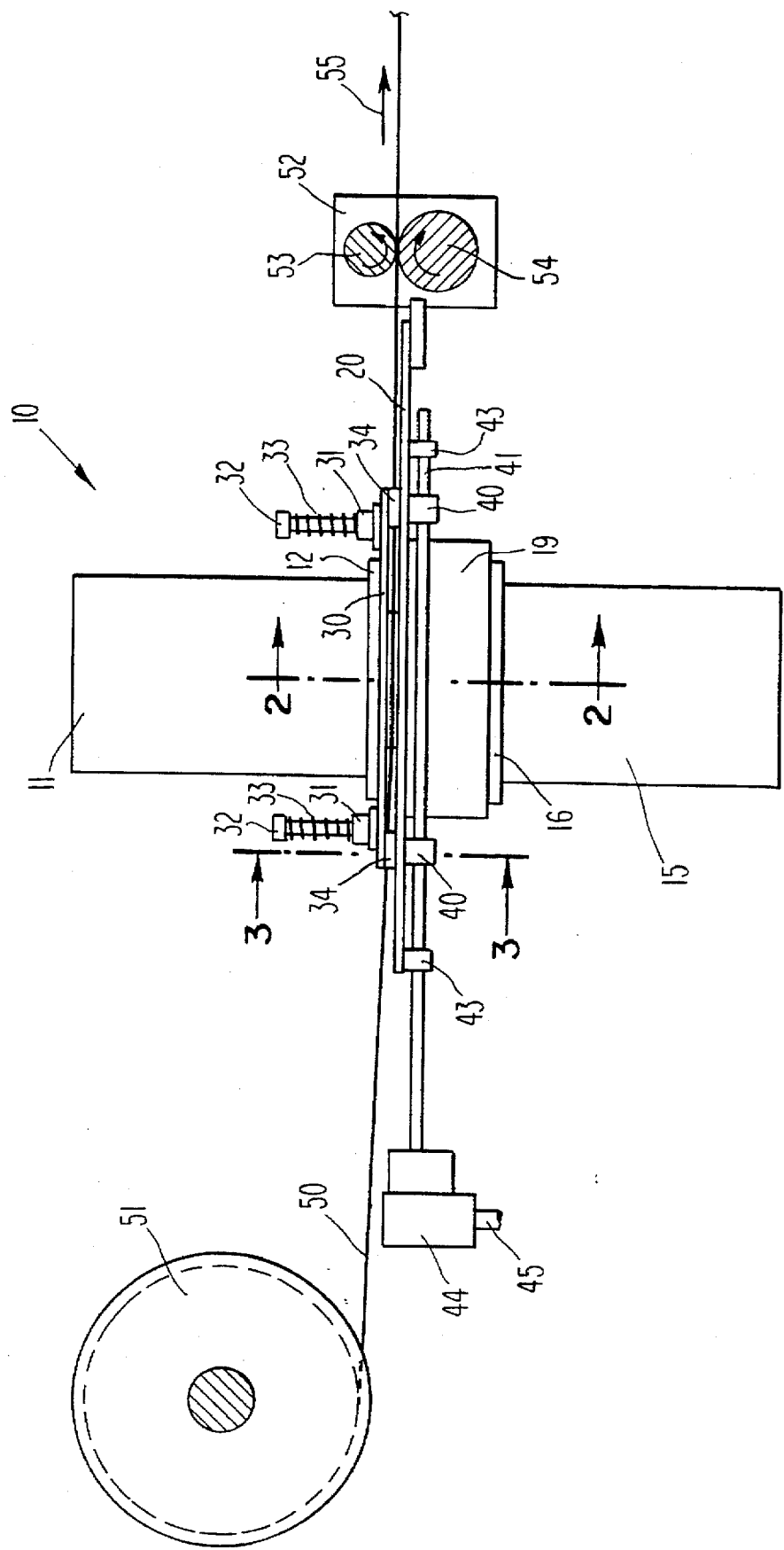
FIG. 1 is a generally schematic side view of a molten metal filtering apparatus in accordance with one embodiment of the present invention.

Referring to the drawings in detail, wherein like reference numerals represent like elements throughout the several figures, FIG. 1 shows a partially schematic side view of a molten metal filtering apparatus 10 in accordance with one embodiment of the present invention. The apparatus 10 includes a generally tubular inlet member 11 comprising a flange portion 12. As shown most clearly in FIG. 2, the inlet member 11 comprises a lining 13 that is preferably made of a refractory material such as magnesia (MgO), alumina ($Al_2O_3$), silica ($SiO_2$) or the like.

Figure 2:
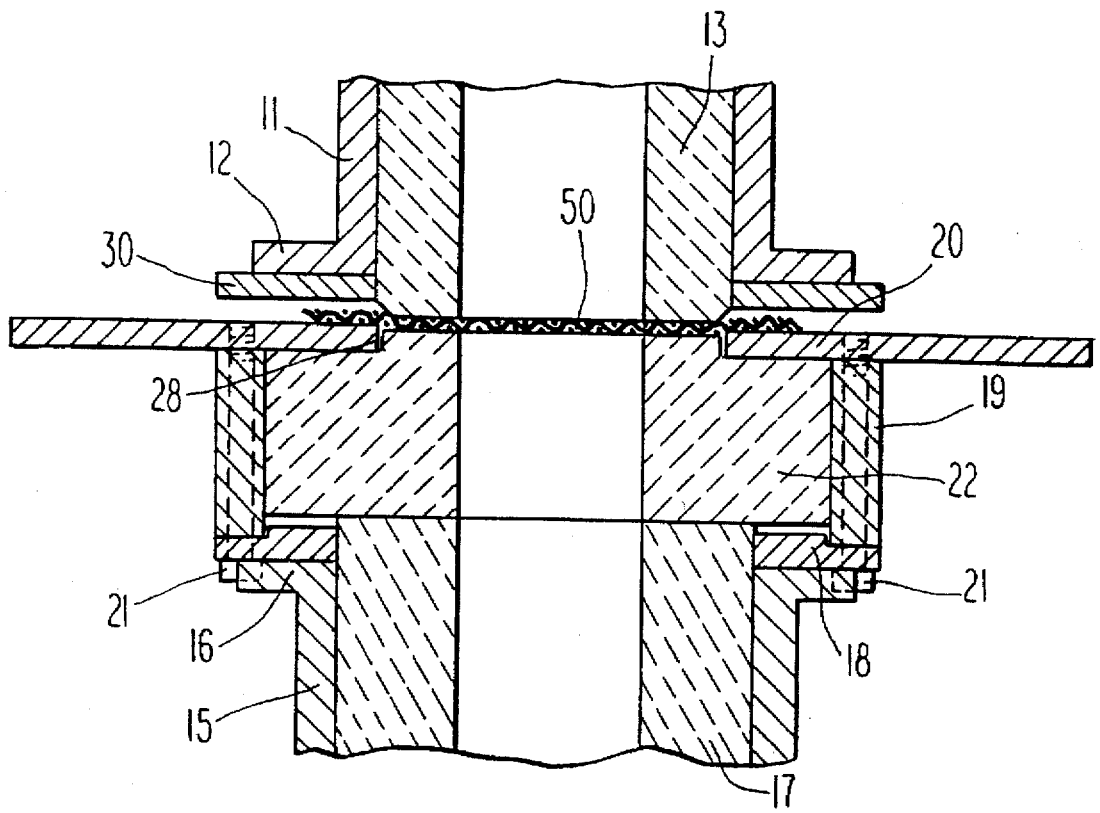
FIG. 2 is a sectional end view taken along line 2—2 of FIG. 1.

The apparatus 10 also includes a generally tubular outlet member 15 including a flange portion 16. As shown most clearly in FIG. 2, the outlet member 15 includes a refractory material lining 17 made of any suitable refractory material, as noted above. The outlet member 15 is preferably connected to a base member 20 by any suitable fastening means. As shown in FIG. 2, the outlet member 15 may be connected to the base member 20 by means of a casing 19 and fastening members 21 such as bolts. The casing 19 may be connected directly to the flange 16 of the outlet member 15, or may be connected to an intermediate plate 18. The casing 19 may contain a refractory material 22 that extends into a cutout portion 28 of the base member 20. While the refractory lining 17 and refractory material 22 are shown as separate pieces in FIG. 2, it is recognized that a single piece of refractory material could be used.

The inlet member 11 is preferably fastened to a plate member 30 that is adapted to move away from the base member 20 in order to allow a new portion of filter material to be advanced or indexed through the apparatus, as discussed more fully below. As shown most clearly in FIGS. 3 and 5, the inlet member 11 may be fastened to the plate member 30 by means of fasteners 35 extending through the flange 12. The fasteners 35 may be bolts, rivets or any other type of suitable fastener. The plate member 30 includes a plurality of hollow cylindrical washers 31 of generally T-shaped cross section adapted to slidably receive a plurality of bolts 32 which are fastened to the base member 20. Biasing members 33 are disposed between the heads of the bolts 32 and the cylindrical washers 31 in order to force the plate member 30 toward the base member 20. While the biasing members 33 are shown schematically as spiral springs in the figures, other suitable biasing members such as leaf springs, hairpin springs, compliant materials such as high temperature polymers and the like may be used. Furthermore, the plate member 30 may be biased toward the base member 20 by the force of gravity, without the requirement of a specific biasing element.

Figure 3:
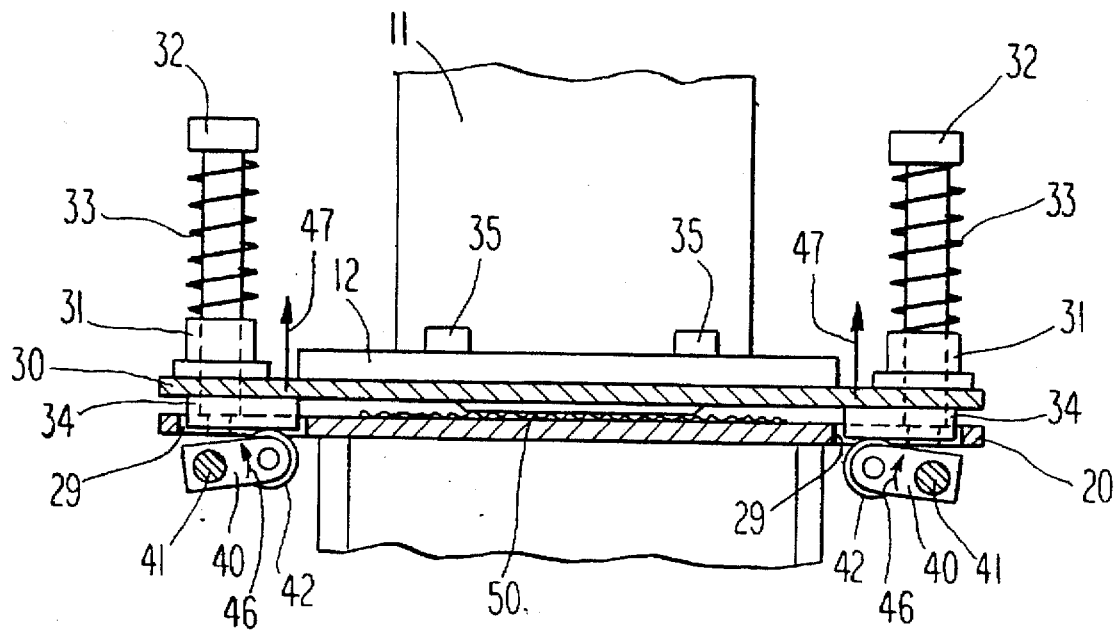
FIG. 3 is a sectional end view taken along line 3—3 of FIG. 1.
Figure 4:
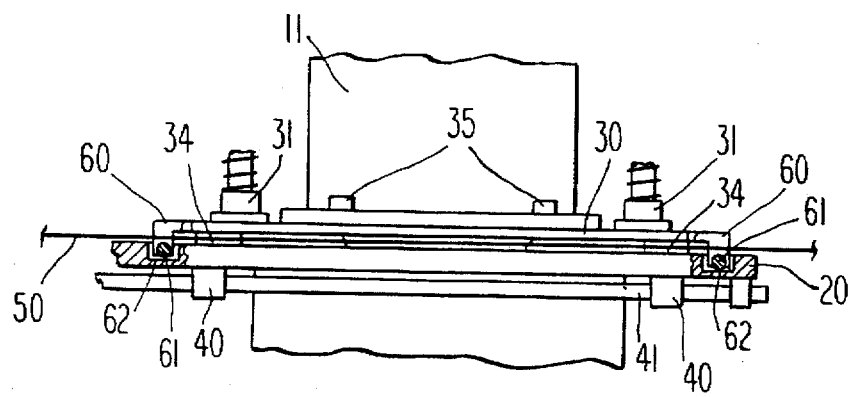
FIG. 4 is a generally schematic partial side view of a molten metal filtering apparatus in accordance with an embodiment of the present invention.

The plate member 30 may include downwardly extending projections 34 as shown in FIGS. 1, 3 and 4. The projections 34 extend through cutout portions 29 in the base member 20, and include cam surfaces adapted for raising the plate member 30 away from the base member 20, as more fully discussed below.

Figure 6:
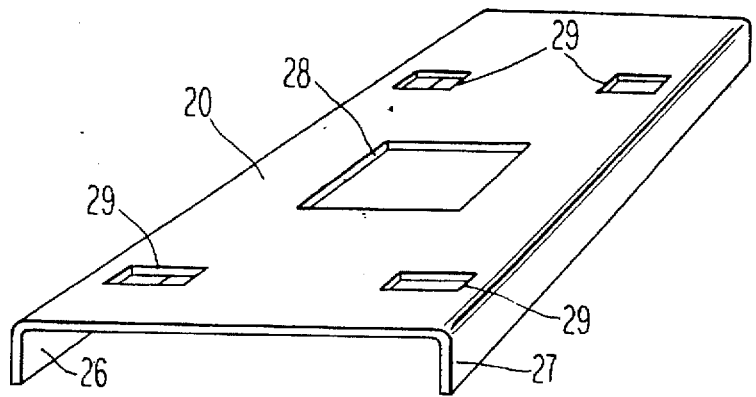
FIG. 6 is a perspective view of a reinforced base member in accordance with one embodiment of the present invention.

While the base member 20 is shown as a relatively flat member in FIG. 1, it is preferred to provide the base member 20 with reinforcements for preventing distortion of the shape of the base member 20 during the molten metal filtering operation. For example, as shown in FIG. 6, the base member 20 may be provided with downwardly extending edge portions 26 and 27 that provide structural rigidity to the base member, thereby preventing warping upon exposure to the increased temperatures associated with molten metal filtration. FIG. 6 also shows the cutout portions 28 and 29 in the base member 20. As discussed previously, the cutout portion 28 is adapted to receive a portion of the refractory material 22, as shown in FIG. 2, while the cutout portions 29 are adapted to receive the downwardly extending projections 34 of the plate member 30, as shown in FIG. 3.

The components of the present apparatus, such as the base member 20, plate member 30, etc., may be made from any suitable material, with high temperature steels being particularly preferred due to their ability to withstand elevated temperatures and their relatively low cost. Components such as the refractory linings 13 and 17 that contact the molten metal during the filtering operation must be capable of withstanding temperatures at least as high as the melting point of the metal being filtered, and preferably well above the melting point of the metal in order to allow for superheating of the metal. Thus, depending on the type of metal to be filtered, the metal-contacting components are selected such that they are able to withstand elevated temperatures at least as high as, e.g., the melting point of lead (328° C.), aluminum (660° C.), iron (1535° C.) or any other metal to be filtered. The preferred refractory linings of the present invention which comprise magnesia, alumina, silica or the like are capable of withstanding very high temperatures, and are particularly suitable for handling a wide range of different molten metals.

The inlet member 11 and the plate member 30 are adapted to move away from the outlet member 15 and the base member 20, against the force of the biasing members 33. As shown in FIGS. 1 and 3, cam members 40 may be used to move the plate member 30 away from the base member 20. The cam members 40 are mounted on actuator rods 41 disposed on either side of the outlet member 15. The cam members 40 preferably include cam rollers 42 in order to reduce friction. However, the cam rollers 42 are not absolutely required, and could be replaced by a curved surface or any other suitable means for contacting the projections 34 of the plate member 30. The actuator rods 41 are preferably rotatably mounted to the base member 20 by means of support brackets 43.

The cam members 40 are actuated by means of any suitable driving source. For example, as shown in FIG. 1, the driving source may be a pneumatic motor 44 connected to a pressurized air supply (not shown) by means of a tube 45. Driving power may thus be supplied to the cam members 40 from the pneumatic motor 44 by means of the actuator rods 41. While a pneumatic motor 44 is preferred due to the high temperatures associated with the molten metal filtration operation, it is recognized that any other suitable power source such as, for example, hydraulic or electric motors may be used.

The molten metal filtering apparatus 10 includes a molten metal filter 50 disposed between the inlet member 11 and the outlet member 15. As shown in FIG. 1, the filter 50 is preferably a continuous sheet of material that is supplied from a roll or coil 51. The filter 50 is serially advanced or indexed into the filtering area between the inlet member 11 and the outlet member 15 by means of the indexing motor 52. The indexing motor 52 comprises opposed indexing rollers 53 and 54 that rotate in opposite directions to pull the filter 50 in the direction of the arrow 55. The indexing motor 52 may be mounted on the base member 20, or may be provided at any other suitable location. The indexing motor 52 is preferably pneumatically operated, but could also be operated hydraulically, electrically or the like.

The molten metal filter 50 is preferably provided as a continuous flexible sheet of material that can be supplied in the form of a roll or coil. The term "continuous" as used herein to describe the filter 50 is meant to include filter materials that can be indexed, portion-by-portion, into the filtering area, as opposed to discrete filter elements that must be individually replaced. Preferably, the continuous filter is of sufficient length that allows multiple indexing steps without the requirement of frequent replacement. For example, the continuous filter may be 50 to 200 feet long. The filter 50 may be provided as a woven or non-woven cloth, with woven cloth being preferred due to the greater ability to control the mesh size of the cloth. A particularly preferred woven cloth comprises silica in a mock leno weave that contains generally square through holes ranging in size from about 1×1 to 2×2 mm.

Preferred filter materials include fiberglass and refractory oxides such as silica, alumina, magnesia and combinations thereof, with silica cloth being particularly preferred for filtering high temperature metals such as, for example, irons and steels. Fiberglass filters are generally preferred for low melting point metals such as, for example, aluminum. Thus, the choice of filter material is dependent on the type of molten metal to be filtered. Typical metals include ferrous metals such as gray, malleable, white and ductile cast irons, and non-ferrous metals such as aluminum, lead, brass and bronze. However, it is to be understood that a wide range of metals can be filtered using the apparatus and method of the present invention.

For the filtration of ferrous metals, coated silica cloth such as disclosed in U.S. Pat. No. 5,124,040 is particularly preferred for use in accordance with the present invention. Such coated silica cloth traps impurities in a manner unlike cellular or reticulated foam ceramic filters. When molten metal reaches the coated cloth filter, a stiffening resin encapsulating the fibers of the filter decomposes, forming a carbonaceous char. During the filtration of ferrous alloys, the decomposition products of the resin react with the iron to form Wustite (FeO), which in turn reacts with the silica fibers to form a layer of fayalite ($2FeO-SiO$). The molten iron temperatures cause the fayalite coating to become soft and sticky so that it captures any non-metallic inclusions that touch it, holding them onto the cloth filter. Since the sticky fayalite film forms instantly, it is possible to filter even micron sized inclusions from the very first metal to pass through the filter.

Figure 5:
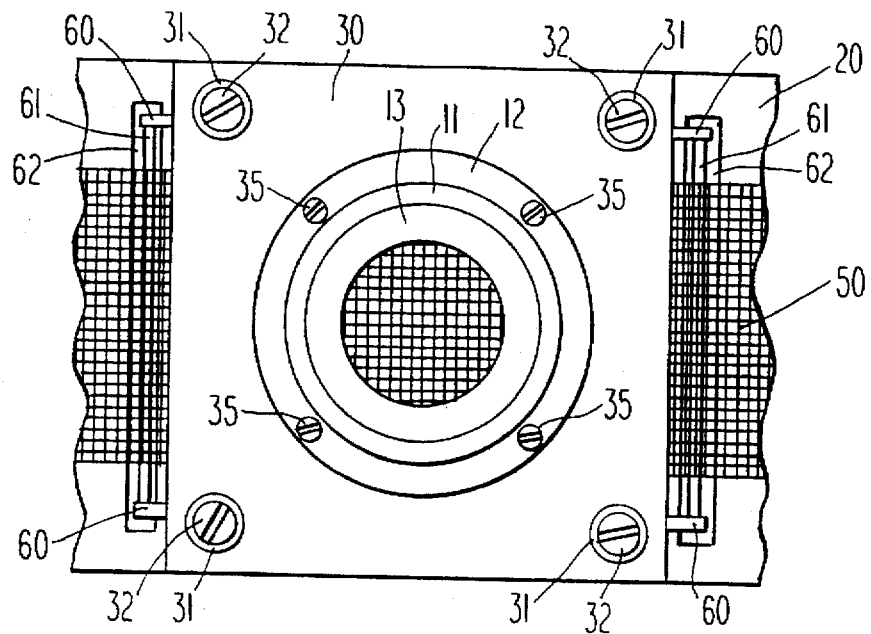
FIG. 5 is a top view of FIG. 4.

A particularly preferred embodiment of the present invention is shown in FIGS. 4 and 5, wherein support members 60 are connected to the plate member 30 on either side of the molten metal filter 50. A rod 61 is disposed between opposing support members 60, below the filter 50, as shown in FIG. 4. When the inlet member 11 and the plate member 30 are drawn against the base member 20 as shown in FIG. 4, the rods 61 are disposed within recesses 62 in the base member 20. When the plate member 30 is moved away from the base member 20, the rods 61 contact the underside of the filter 50 and raise the filter along with the plate member 30. As discussed more fully below, such a configuration allows for the filter 50 to be raised from the surface of the base member 20 in order to facilitate advancement of the filter 50 if the underside of the filter includes frozen metal left over from the filtering operation.

Figure 7:
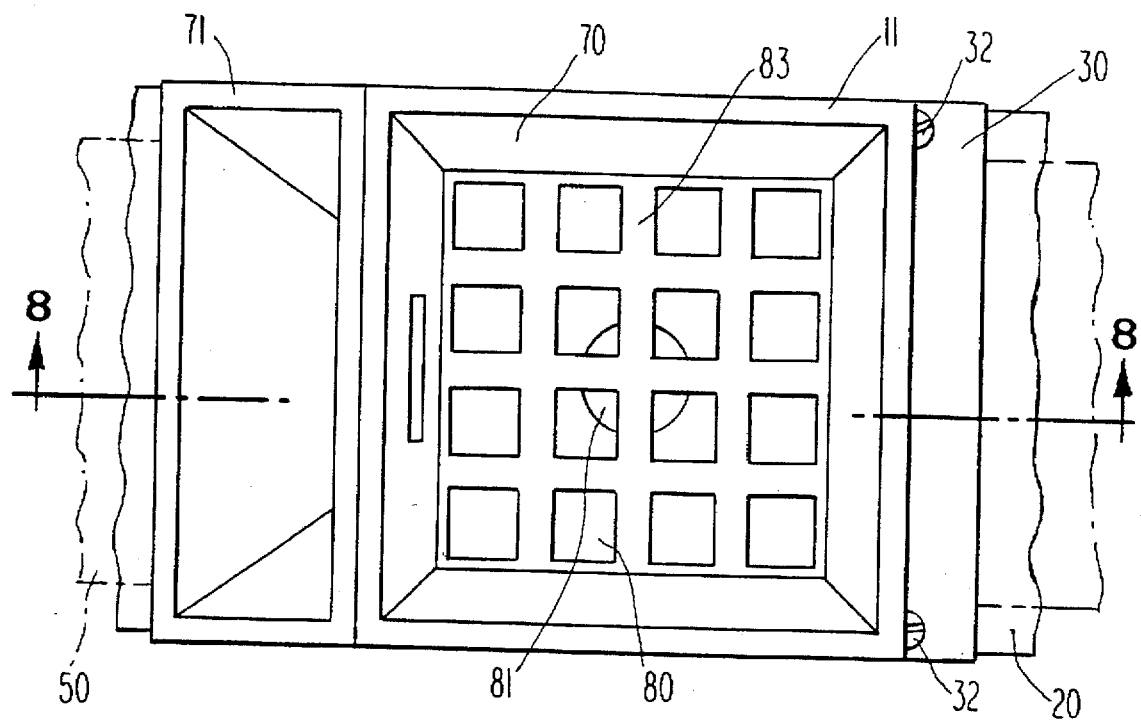
FIG. 7 is a generally schematic partial top view of a molten metal filtering apparatus in accordance with another embodiment of the present invention.
Figure 8:
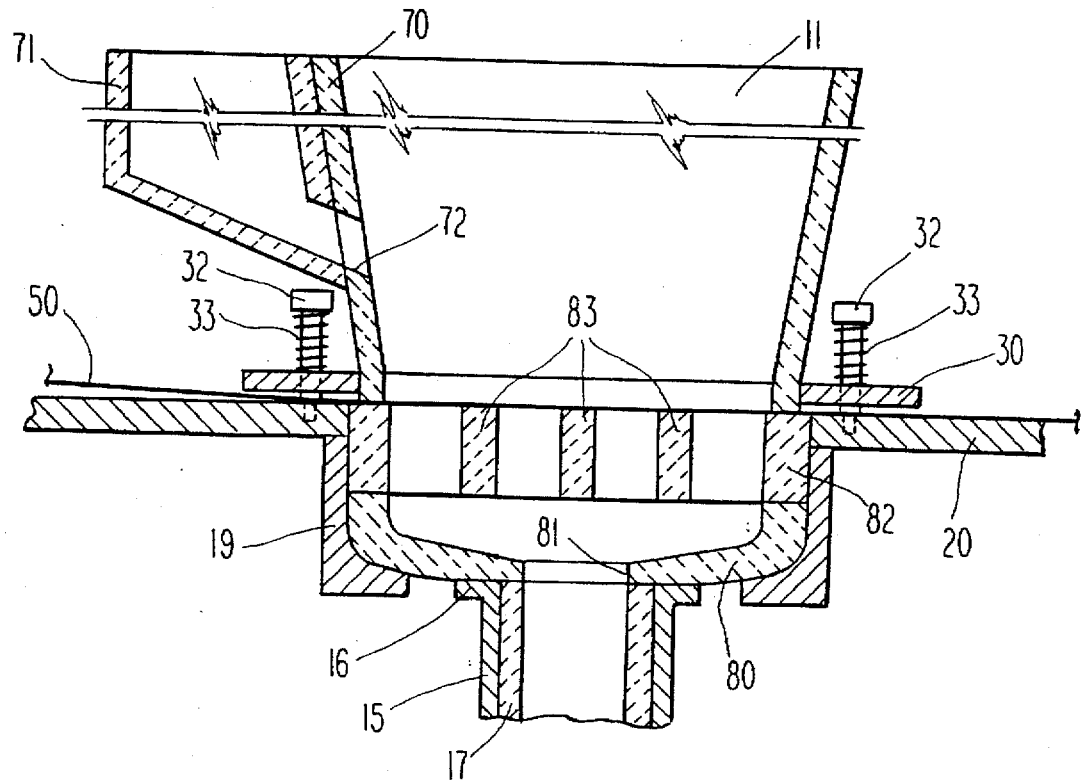
FIG. 8 is a sectional side view taken along line 8—8 of FIG. 7.

FIGS. 7 and 8 illustrate another embodiment of the present invention wherein the apparatus is adapted for filtering relatively large volumes of molten metal. In this embodiment, the inlet member 11 includes a filter box 70 in communication with a pouring box 71 by means of an opening 72. The filter box 70, pouring box 71 and opening 72 may be made of any suitable material capable of withstanding molten metal temperatures. While the filter box 70 and pouring box 71 are shown as being made of refractory material in FIGS. 7 and 8, these components could also be made of refractory-lined metal casings or any other suitable material. It is noted that the filter box 70 may extend to a greater height than shown in FIG. 8 in order to accomodate the desired volume of molten metal.

In the embodiment shown in FIGS. 7 and 8, the outlet member 15 is disposed below a refractory basin 80 that includes generally upwardly extending side walls and a bottom floor that is sloped toward an opening 81, which in turn is in flow communication with the interior of the refractory lining 17. A refractory material grid 82 comprising cross members 83 is disposed above the refractory basin 80. As discussed more fully below, the cross members 83 of the refractory grid 82 serve to support the filter 50 during the molten metal filtering operation. The refractory basin 80 and refractory grid 82 may be made of any suitable refractory material such as, for example, castable ceramic. While the refractory basin 80 and the refractory grid 82 are preferably provided as separate pieces as shown in FIG. 8, it is recognized that they could be provided as a single unit.

The apparatus shown in FIGS. 7 and 8 is particularly suited for filtering relatively large volumes of molten metal in amounts up to approximately 5,000 pounds or more. For large volumes of metal, the dimensions of the refractory grid 82 may range from less than 1 ft.×1 ft. to more than 2 ft.×2 ft. Thus, the area covered by the grid as shown in the top view of FIG. 7 may range from less than 1 sq. ft. to more than 4 sq. ft., depending on such factors as the amount of molten metal to be filtered and the rate at which filtering is to proceed. It is recognized that the embodiment shown in FIGS. 7 and 8 is not necessarily drawn to scale, and that considerable modification of the size and shape of the various elements is possible.

The apparatus of the present invention operates as follows. Molten metal is introduced into the inlet member 11 by any suitable means such as a trough, runner, ladle, holding furnace or the like. When the molten metal is introduced into the apparatus, the inlet member 11 and the plate member 30 are disposed adjacent to the base member 20 of the outlet member 15. As shown most clearly in FIG. 2, the filter 50 is pressed between the refractory lining 13 of the inlet member and the refractory material 22 of the outlet member 15. This is accomplished by extending the refractory lining 13 slightly below the bottom of the plate member 30, and by extending the refractory material 22 into the cutout 28 of the base member 20. The refractory lining 13 and the refractory material 22 thus serve to clamp the filter 50 in place and to protect the components of the apparatus, such as the base member 20 and the plate member 30, from the high temperatures of the molten metal.

Molten metal introduced into the inlet member 11 flows through the filter 50 and exits the apparatus by way of the outlet member 15. While the outlet member 15 is shown as a generally tubular structure in the figures, it is recognized that other configurations such as, troughs, runners, casting molds, holding furnaces and the like are also suitable outlet members.

The apparatus of the present invention can be placed at any suitable location in the molten metal processing operation. For example, the apparatus may be located directly upstream from a casting mold, or over the inlet to a molten metal holding furnace. As a particular, non-limiting example, it may be advantageous to filter ferrous molten metals before the metal is introduced into a conventional holding furnace. Large amounts of batch-treated metal can be filtered. For example, ductile iron may be filtered when it is added to a holding furnace that supplies molten metal to an automated molding line. Alternatively, for smaller castings of non-ferrous metals such as aluminum, it may be advantageous to place the outlet of the apparatus directly over the inlet to a shot tube on a conventional die caster. In the case of die casting, the apparatus can be used to automatically filter the metal going into each casting directly at the shot tube.

After the desired amount of molten metal is filtered through the apparatus 10, the flow of metal is stopped to allow a new section of the filter 50 to be indexed into the area between the inlet member 11 and the outlet member 15, thereby permitting a fresh portion of the filter 50 to be placed in the path of the molten metal stream.

Indexing of the molten metal filter 50 is accomplished by raising the plate member 30 away from the base member 20 in order to allow the filter 50 to be freely advanced in the direction of the arrow 55 in FIG. 1. A preferred technique for moving the plate member 30 away from the base member 20 is by the use of the cam members 40. The pneumatic motor 44 rotates the actuator rods 41 which are disposed on opposite sides of the outlet member 15. Rotation of the actuator rods 41 causes rotation of the cam members 40 and cam rollers 42, as shown by the arrows 46 in FIG. 3. The cam rollers 42 bear against the lower surfaces of the downwardly extending projections 34 of the plate member 30 in order to move the plate member upwardly in the direction of the arrows 47 in FIG. 3. The plate member 30 thus moves upwardly against the force of the biasing members 33. As shown most clearly in FIG. 2, the movement of the plate member 30 away from the base member 20 causes the refractory lining 13 to move away from the refractory material 22 to thereby allow the molten metal filter 50 to move freely in the horizontal direction.

In a particularly preferred embodiment as shown in FIGS. 4 and 5, the rods 61, which are supported on the plate member 30 by means of the supports 60, are disposed beneath the filter 50. In the closed position as shown in FIG. 4 the rods 61 are seated within recesses 62 in the base member 20. However, when the plate member 30 is raised the rods 61 contact the underside of the filter 50, thereby raising the filter 50 above the upper surface of the base member 20. This configuration is particularly advantageous where molten metal has frozen on the underside of the filter 50 during the filtering operation. By using the rods 61 to raise the filter 50 above the surface of the base member 20, any metal that has solidified on the underside of the filter 50 should be provided with sufficient clearance so as not to impede the advancement of the filter during the indexing step.

Once the plate member 30 is moved away from the base member 20, a new portion of the filter 50 may be indexed into place by means of the indexing motor 52. As shown in FIG. 1, the indexing rollers 53 and 54 rotate in opposite directions in order to pull the filter 50 in the direction of the arrow 55. The length of the filter 50 that is pulled through the apparatus with each indexing step can be adjusted to any desired amount. Preferably, the filter 50 is advanced a sufficient amount to provide a new portion of the filter in the entire area of molten metal contact. As shown in FIG. 1, the filter 50 is preferably provided on a supply roll 51 that rotates freely when the filter 50 is pulled through the apparatus by the indexing motor 52. The supply roll 51 may be provided with a slight rotational resistance in order to provide tension on the filter 50 to prevent slack.

In a preferred embodiment, the pneumatic motor 44 and indexing motor 52 are automatically controlled such that the pneumatic motor 44 first rotates the cam members 40 a sufficient amount to raise the plate member 30, followed by actuation of the indexing motor 52 to pull the desired length of the filter 50 through the apparatus, followed by actuation of the pneumatic motor 44 to rotate the cam members 40 to thereby lower the plate member 30 against the base member 20. In a particularly preferred embodiment, the flow of molten metal through the apparatus is also automatically controlled such that the flow is stopped during the indexing operation, and is then started once the new portion of the filter 50 has been indexed into place. In this manner, the molten metal filtering operation can be totally automated, thereby avoiding the increased cost and time associated with prior art molten metal filtering processes.

Sensors may be used with the apparatus to indicate when the appropriate length of the filter 50 has been pulled through the apparatus and/or to indicate when the plate member 30 is in the raised or lowered position. Such sensors may be of any suitable type, including photoelectric, infrared, laser, mechanical and the like.

The operation of the apparatus as shown in the embodiment of FIGS. 7 and 8 is similar to that previously discussed, and is particularly suitable for filtering relatively large amounts of molten metal. For example, the filter box 70 as shown in FIGS. 7 and 8 may be capable of holding 5,000 pounds or more of molten metal. In this embodiment, the molten metal is first introduced into the pouring box 71 and then flows into the filter box 70 by means of the opening 72. The pouring box 71 can be used to more uniformly distribute the molten metal over the surface of the filter 50, in comparison with directly pouring the molten metal into the filter box 70 by means of a ladle or the like.

Due to the relatively large surface area of the filter 50 that is exposed to the molten metal, the apparatus of FIGS. 7 and 8 includes the refractory grid 82 as a means of support. For example, the grid area shown in the top view of FIG. 7 may be approximately 18 inches×18 inches, in which case the filter 50 might tend to sag to an undesirable degree without the support of the cross members 83 of the refractory grid 82. While a square grid is shown in FIGS. 7 and 8, it is recognized that any suitable grid geometry may be used. For example, the holes between the cross members 83 could be circular, hexagonal, or any other suitable shape. Furthermore, the ratio of the area of the openings between the cross members 83 to the area of the cross members 83 themselves can be varied, with the criteria that the cross members 83 must be of sufficient thickness to adequately support the filter 50 during the filtering operation, but must not be so thick as to restrict the flow of molten metal to an undesirable degree. The refractory grid 82 and refractory basin 80 are preferably made of castable ceramic and are relatively easily replaced in the apparatus after they have become worn or eroded.

The present invention achieves several advantages over prior art molten metal filtering processes. In typical prior art filtering operations, the filters, which may comprise hard-fired cellular or reticulated ceramic blocks or refractory cloths, must be individually placed in the molten metal stream. Manual placement of discrete filter elements is time consuming and can lead to excessive processing costs. In accordance with the present invention, an advantage is gained in being able to filter metals being poured into casting machines and permanent molds at the very last moment, and have a new or fresh filter index into place automatically. Another advantage is obtained by being able to filter large amounts of metal that has been treated with ferroalloys, inoculants and master alloys, before being placed into holding furnaces or pouring ladles. By providing a continuous filtering medium that is serially indexed into position, the present invention eliminates the problems associated with discrete filter elements and provides a substantially expedited process that can be automated, thereby significantly reducing costs.

Various modifications of the presently described embodiments are possible. For example, the configurations of the inlet member 11 and outlet member 15 can be varied considerably in order to conform to wide ranging molten metal filtration requirements. In addition, the means for moving the inlet member 11 away from the outlet member 15 in order to allow indexing of the filter 50 can be modified from the embodiments shown herein. For example, the inlet member 11 could be held stationary while the outlet member 15 is moved. Furthermore, the means for indexing the filter 50 through the apparatus 10 can be varied depending on such factors as the type of filter medium that is used and the specific filtering operation employed.

Accordingly, it is understood that the above description of the present invention is susceptible to considerable modifications, changes and adaptations by those skilled in the art, and that such modifications, changes and adaptations are intended to be considered within the scope of the present invention, which is set forth by the appended claims.

What is claimed is:

1. A method for filtering molten metal comprising:
   (a) providing a flow of molten metal;
   (b) passing the molten metal through a first portion of a filter for molten metal in an area of the molten metal flow;
   (c) stopping the flow of molten metal;
   (d) serially indexing a second portion of the filter for molten metal into the area of the molten metal flow;
   (e) continuing the flow of molten metal; and
   (f) passing the molten metal through the second portion of the filter for molten metal.

2. The method of claim 1, wherein the filter for molten metal comprises a continuous roll of refractory cloth comprising silica, alumina, fiberglass or a combination thereof.

3. The method of claim 1, wherein the second portion of the filter for molten metal is indexed into the area of the molten metal flow by moving a plate member away from a base member that hold the first portion of the filter for molten metal therebetween, moving the second portion of the filter for molten metal between the plate and base members, and moving the plate member toward the base member to hold the second portion of the filter therebetween.

4. The method of claim 3, wherein the plate member is biased toward the base member and the plate member is moved away from the base member by at least one cam member rotatably mounted on the base member and in contact with the plate member.

5. The method of claim 1, wherein the filter for molten metal comprises silica cloth.

6. The method of claim 1, wherein the filter for molten metal comprises fiberglass.

7. The method of claim 1, wherein the molten metal comprises iron.

8. The method of claim 1, wherein the molten metal comprises aluminum.

9. The method of claim 1, further comprising:
   (a) providing the flow of molten metal through a refractory lined inlet;
   (b) providing a refractory lined outlet in fluid flow communication with the refractory lined inlet to receive the molten metal; and
   (c) sandwiching the filter for molten metal between the refractory lined inlet and outlet during the flow of molten metal.

10. The method of claim 9, further comprising biasing the refractory lined inlet and outlet toward each other to secure the filter for molten metal therebetween.

11. The method of claim 9, further comprising separating the refractory lined inlet and outlet from each other during the serial indexing of the second portion of the filter for molten metal into the area of the molten metal flow.

12. The method of claim 11, further comprising moving the filter for molten metal away from the refractory lined outlet when the refractory lined inlet is separated from the refractory lined outlet.

13. The method of claim 1, further comprising supporting the filter for molten metal in the area of the molten metal flow.

14. The method of claim 13, wherein the filter for molten metal is supported in the area of molten metal flow by a grid of refractory material.

* * * * *